(12) United States Patent
Verwijs et al.

(10) Patent No.: US 7,378,559 B2
(45) Date of Patent: May 27, 2008

(54) CONTINUOUS PROCESS AND SYSTEM OF PRODUCING POLYETHER POLYOLS

(75) Inventors: Jan W. Verwijs, Hoek (NL); John W. Weston, Sugar Land, TX (US); Walter J. S. Papadopulos, Antwerp (BE); Richard J. Elwell, Stade (DE); Carlos M. Villa, Lake Jackson, TX (US)

(73) Assignee: Dow Global Technologies Inc., Midland, MI (US)

( * ) Notice: Subject to any disclaimer, the term of this patent is extended or adjusted under 35 U.S.C. 154(b) by 19 days.

(21) Appl. No.: 10/545,661

(22) PCT Filed: Mar. 5, 2004

(86) PCT No.: PCT/US2004/006643

§ 371 (c)(1),
(2), (4) Date: Aug. 15, 2005

(87) PCT Pub. No.: WO2004/081082

PCT Pub. Date: Sep. 23, 2004

(65) Prior Publication Data

US 2006/0155151 A1    Jul. 13, 2006

Related U.S. Application Data

(60) Provisional application No. 60/453,073, filed on Mar. 7, 2003.

(51) Int. Cl.
*C07C 43/11*        (2006.01)
*C07C 43/00*        (2006.01)

(52) U.S. Cl. .................................... 568/619; 568/679
(58) Field of Classification Search ................ 568/619
See application file for complete search history.

(56) References Cited

U.S. PATENT DOCUMENTS

| | | |
|---|---|---|
| 3,278,457 A | 10/1966 | Milgrom |
| 3,278,458 A | 10/1966 | Belner |
| 3,278,459 A | 10/1966 | Herold |
| 3,404,109 A | 10/1968 | Milgrom |
| 3,427,256 A | 2/1969 | Milgrom |
| 3,427,334 A | 2/1969 | Belner |
| 3,427,335 A | 2/1969 | Herold |
| 3,829,505 A | 8/1974 | Herold |
| 5,470,813 A | 11/1995 | Le-Khac |
| 5,482,908 A | 1/1996 | Le-Khac |
| 5,563,221 A | 10/1996 | Pazos |
| 5,689,012 A | 11/1997 | Pazos et al. |
| 5,731,407 A | 3/1998 | Le-Khac |
| 5,767,323 A | 6/1998 | Televantos et al. |
| 5,770,678 A | 6/1998 | Drysdale et al. |
| 5,777,177 A | 7/1998 | Pazos |
| 5,789,626 A | 8/1998 | Le-Khac |
| 6,018,017 A | 1/2000 | Le-Khac |
| 6,063,897 A | 5/2000 | Le-Khac et al. |
| 6,143,802 A | 11/2000 | Simroth et al. |
| 6,204,357 B1 | 3/2001 | Ooms et al. |
| 6,303,533 B1 | 10/2001 | Grosch et al. |
| 6,323,350 B1 * | 11/2001 | Lindner et al. ............. 549/532 |
| 6,323,375 B1 | 11/2001 | Hofmann et al. |
| 6,835,687 B2 * | 12/2004 | Hofmann et al. ........... 502/175 |

FOREIGN PATENT DOCUMENTS

| | | |
|---|---|---|
| EP | 0776922 A1 | 6/1997 |
| JP | 6-16806 | 1/1994 |
| WO | WO-0172418 A1 | 10/2001 |
| WO | WO-2004009671 A1 | 1/2004 |

OTHER PUBLICATIONS

Villa et al. Complex dynamic behavior during polyol preparation in continuous processes using heterogeneous double metal cyanide. AIChE Annual Meeting, Conference Proceedings, Austin TX Nov. 7-12, 2004.*
G. Wegener et al., Trends in Industrial Catalysis in the Polyurethane Industry, Applied Catalysis A, 2001, p. 303-335, General 221.
Jean-Louis Gustin, Hazards XV: the Process, Its Safety and the Environment-Getting It Right!, Institution of Chemical Engineers by Synposium Series, 2000, p. 250-263.
American Institute of Chemical Engineers, Fire & Explosion Index Hazard Classification Guide, 1987, p. 5, 57-59, 6th edition.

* cited by examiner

*Primary Examiner*—Yvonne Eyler
*Assistant Examiner*—M. Louisa Lao

(57) ABSTRACT

A continuous process and system for producing polyether polyols that allows for continuously adding an unreacted oxide to a loop reactor while adding at least one thermally deactivating catalyst capable of thermally deactivating prior to decomposition of polyether polyol which can allow for greater concentrations of unreacted oxides and/or a rate of reaction in the loop reactor is at a rate at least two times faster than a rate of reaction in a loop reactor containing less than 14 weight percent unreacted oxide. In a preferred embodiment, the catalyst is a double metal cyanide catalyst and a plug flow reactor is formed in series with the loop reactor wherein neither reactor contains a vapor space.

11 Claims, 4 Drawing Sheets

CONTINUOUS PROCESS AND SYSTEM OF PRODUCING POLYETHER POLYOLS

CROSS-REFERENCE TO RELATED APPLICATIONS

This application is a 371 of PCT/US04/06643 Mar. 5, 2004 which claims benefit of 60/453,073 Mar. 7, 2003.

This invention relates to the process and systems for the preparation of polyether polyols.

Polyether polyols are used in the preparation of polyurethanes. These polyethers are commonly prepared by polymerizing one or more alkylene oxides in the presence of an initiator compound and a catalyst.

Polyethers are prepared in large commercial quantities through the polymerization of these alkylene oxides such as propylene oxide and ethylene oxide. The initiator compound usually determines the functionality (number of hydroxyl groups per molecule) of the polymer and in some instances incorporates some desired functional groups into the product. The catalyst is used to provide an economical rate of polymerization and/or control product quality.

Historically, basic metal hydroxides or salts, such as potassium hydroxide, were used as a catalyst. Polyether polyols are typically made in semi-batch reactors. Potassium hydroxide has the advantages of being inexpensive, adaptable to the polymerization of various alkylene oxides, and easily recoverable from the product polyether.

It is furthermore known to use multimetal cyanide compounds, in particular zinc hexacyanometallates, as catalysts. These complexes include compounds often referred to as multimetal cyanide or double metal cyanide (DMC) catalysts. These compounds are the subject of a number of patents. Those patents include U.S. Pat. Nos. 3,278,457, 3,278,458, 3,278,459, 3,404,109, 3,427,256, 3,427,334, 3,427,335, 5,470,813, 5,482,908, 5,563,221, 5,689,012, 5,731,407, 5,770,678, 5,771,177, 5,789,626, 6,018,017, 6,204,357, and 6,303,533. In some instances, these metal cyanide complexes provide the benefit of fast polymerization rates and narrow polydispersities.

The composition of these catalysts can vary widely, but can generally be represented by the formula:

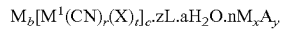

$$M_b[M^1(CN)_r(X)_t]_c \cdot zL \cdot aH_2O \cdot nM_xA_y$$

wherein M is a metal ion that forms an insoluble precipitate with the metal cyanide grouping $M^1(CN)_r(X)_t$ and which has at least one water soluble salt;

$M^1$ is a transition metal ion;

X represents a group other than cyanide that coordinates with the $M^1$ ion;

L represents an organic complexing agent;

A represents an anion that forms a water-soluble salt with M ion;

b and c are numbers that reflect an electrostatically neutral complex;

r is from 4 to 6; t is from 0 to 2; and z, n and a are positive numbers (which may be fractions) indicating the relative quantities of the complexing agent, water molecules and $M_xA_y$, respectively.

One of the most common of these metal cyanide complexes is zinc hexacyanocobaltate. Together with the proper complexing agent and an amount of a poly(propylene oxide), it has the advantages of being active. In the prior art, polyether polyols were prepared in batch processes. In these, the catalyst is suspended in the initiator. When the reaction is complete, the catalyst must be separated from the final product. Therefore, a need exists to provide a process and system to produce polyether polyols in a continuous fashion.

The art such as Laid Open Japanese Patent Application KOKAI No. Hei 6-16806 disclosed continuous reactors with double metal cyanide catalysts that were baclanixed reactors. It disclosed that the molecular weight distribution of the product using alkali catalysts was too high, but with double metal cyanide catalysts, the molecular weight distribution was acceptable. Processes using double metal cyanide catalysts have been shown effective in continuous processes such as seen in U.S. Pat. Nos. 5,689,012, 5,470,813, and 5,482,908. However, these references rely on stirred tank reactors and/or plug flow reactors wherein the unreacted oxide was not maintained at a steady state.

Of note, U.S. Pat. No. 3,829,505 discloses that the propagation step of this reaction is exothermic and that some monomers may telomerize very rapidly in the presence of the conventional DMC catalyst. This may be controlled by the choice of the concentration of the catalyst, by use of a diluent, and by the proper choice of temperature. This patent fails to disclose or teach the benefits of the use of unreacted oxide to control reaction rate. Moreover, this patent fails to disclose or teach the use of a loop reactor in series with a plug flow reactor. Futhermore, this reference neither teaches the effect of oxide concentration, nor optimal temperature due to deactivation of catalyst.

For economic implementation of double metal cyanide catalysts and continuous reactor for large commodity polyols, the cost and usage level of the catalyst is important to minimize. Typically backmixed reactors require a higher level of catalysis than a plug flow reactor. For example, U.S. Pat. No. 5,767,323 disclosed double metal cyanide catalysis that were higher in activity than conventional double metal cyanide catalysts, ultimately disclosing an "Exceptionally Active DMC" catalyst. These catalysts were claimed to achieve less than 15 ppm catalyst level. This thermally stable double metal cyanide catalyst was most preferably stable at temperatures of 150° C. to 160° C. Higher reactor temperatures were preferred.

It is common practice to operate reactors polymerizing oxides with a controlled amount of oxide present. For safety reasons, the reactors are operated below a specified unreacted oxide concentration such that if a loss of cooling situation occurs, the adiabatic temperature rise of the reaction mixture does not approach the temperature at which the polyether rapidly decomposes, which is greater than 250° C. as shown in Gustin, Jean-Louis, The Process, Its Safety and the Environment—Getting It Right, Institution of Chemical Engineers Symposium (200) Safety of Ethoxylation Reactions, 147 Hazards XV.

Notably, Dow's Fire & Explosion Index Hazard Classification Guide 1987—published via the American Institute of Chemical Engineers in Appendix B Example problem 4 on page 58 suggests that 15 percent unreacted propylene oxide is a "worst case reaction mixture" for a polyol batch process reactor operating at a maximum reaction temperature of 120° C. For potassium hydroxide reactions, neutralization of the reaction has been proposed as shown in Gotoh and Andoh, Chemical Stopper for runaway propoxylation, Nagoya Fact. Sanyo Chem, Ind., Ltd., Tohkai, Japan. Yukagaku (19993), 42(1), 17-20. Unfortunately the adiabatic temperature rise is so fast that emergency or secondary controls can not be implemented fast enough to prevent a high pressure event.

Therefore, a need exists for a catalyst that deactivates at temperatures above the polymerization and temperatures below the decomposition of the constituents. Additionally, a need exists to continuously produce polyether polyols using a thermally deactivating catalyst capable of preventing a runaway reaction.

Double metal cyanide catalysts or other thermally deactivated catalysts improve the safety of reactors and allow for them to be operated at higher unreacted oxides concentrations. Catalysts that thermally deactivate allow time for secondary or emergency backup methods, such as emergency cooling, reaction quench methods, and backup power, to be implemented.

By employing a thermally deactivating catalyst for alkoxylation, safety restrictions associated with limiting oxide concentration may be relaxed. Typically polymerization catalysts have first order linetics with respect to oxide concentration. Therefore, operating reactors at high levels of unreacted oxides would lead to more advantageous kinetics, which would allow for either greater productivity or reduced catalyst usage. Conventional double metal cyanide catalysts may be used and would be preferred, because they are easier and cheaper to produce and operate at lower temperatures. It is possible that some exceptionally active cyanide catalysts may be too reactive and the systems could be difficult to control or assure remaining below 250° C.

In a preferred embodiment, the continuous process of producing polyether polyol includes continuously adding an unreacted oxide to a loop reactor, while adding at least one thermally deactivating catalyst and at least one initiator to the loop reactor; and reacting at least a portion of the unreacted oxide to form polyether polyol, wherein the thermally deactivating catalyst is capable of thermally deactivating prior to decomposition of the polyether polyol, and wherein the unreacted oxide in the loop reactor is more than about 14 weight percent. In a preferred embodiment, the catalyst is a double metal cyanide catalyst that is mixed in a pumpable slurry of a carrier.

The unreacted oxide may be ethylene oxide, propylene oxide, butylene oxide, and/or a mixture of ethylene oxide, propylene oxide, and butylene oxide. Typically, the initiator is a monol or polyol of diverse MW or/and functionality. The process may be conducted under controlled pressure. Moreover, the unreacted oxide and polyether polyol may also pass through a plug flow reactor. Preferably, the amount of unreacted oxide in the loop reactor is no more than about 20 weight percent and/or the catalyst in the loop reactor is less than about 150 ppm. This process may allow for a rate of reaction in the loop reactor at a rate at least two times faster than a rate of reaction in a loop reactor containing less than 14 weight percent unreacted oxide.

The system for the continuous process of producing polyether polyol preferably includes a loop reactor containing at least one thermally deactivating catalyst and a plug flow reactor following the loop reactor wherein the loop reactor and the plug flow reactor do not contain a vapor space. This system may also include at least one pump and/or at least one heat exchanger in the loop reactor. In a preferred embodiment, the system includes a recycling loop capable of returning the loop reactor, a portion of the unreacted oxide from an oxide flash column placed after the plug flow reactor.

Those skilled in the art will recognize that the figures shown here represent just one method of the invention. Accordingly, significant deviations from the figures are considered to be within the scope of the invention, and nothing herein shall be considered to limit the scope of the invention as depicted in the claims.

The invention relates to a continuous method of producing polyether polyols by reacting initiators, such as diols or polyols, with ethylene oxide, propylene oxide, butylene oxide or mixtures thereof in the presence of a coordination type catalyst, like a multimetal cyanide complex catalyst. The term "continuous" is herein defined as a process wherein at least one reagent is fed into at least one reactor while a polymeric product is removed simultaneously during at least part of the reaction process.

Figure 1:
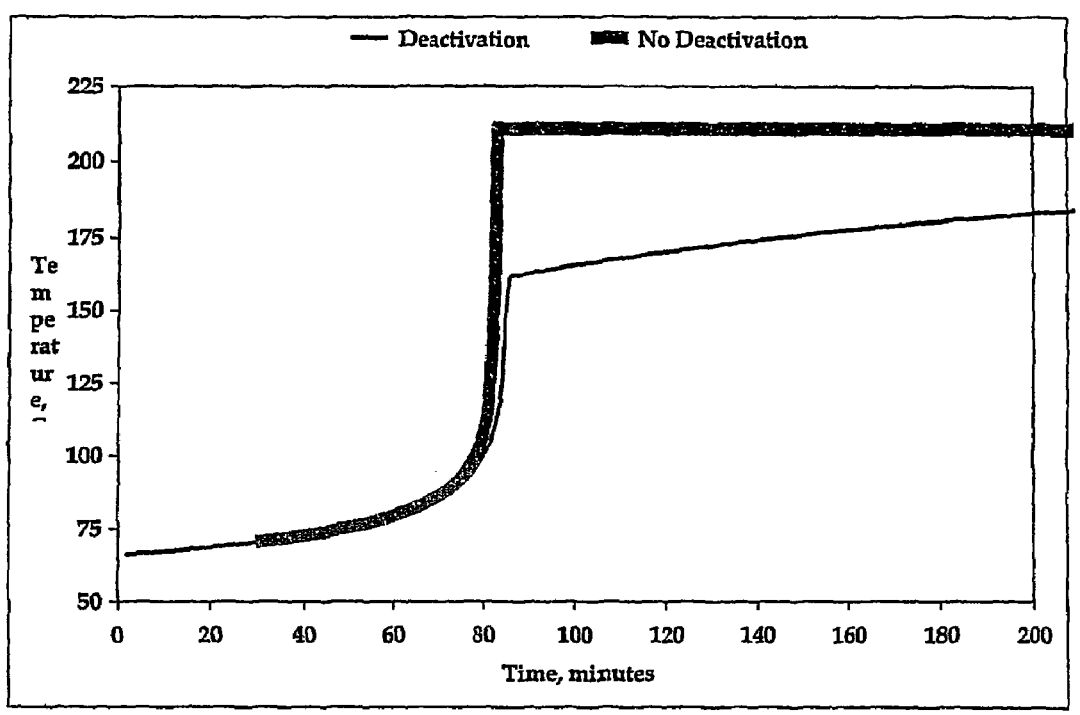
FIG. 1 is a graph that shows the effect of a deactivating catalyst during an adiabatic exotherm with 20 percent by weight propylene oxide initial concentration.

The concepts of the present invention show the inclusion of at least one catalyst capable of thermally deactivating the reaction prior to decomposition of the polyether polyol. FIG. 1 shows a computer simulation of the adiabatic temperature rise during a loss of cooling situation for conventional DMC versus potassium hydroxide (KOH) with 20 percent unreacted oxide by weight. This shows that a significant amount of time is still available before emergency methods are required. Moreover, this graph displays the advantage of including a thermally deactivating catalyst during an adiabatic exotherm with 20 percent by weight propylene oxide initial concentration. The advantages of including a thermally deactivating catalyst are evident in that the rapid decomposition temperature of polyether polyol is either not reached or it is reached in such a slow manner that measures may be taken to prevent decomposition.

The reaction is preferably performed in a loop reactor and preferably a plug flow reactor in series. Any unreacted oxides leaving the plug flow reactor can be converted in a subsequent digester vessel or stripped out in a vacuum flash column. In a most preferred embodiment, the oxides, and the initiator, preferably containing the catalyst in a pumpable slurry, are fed into the loop reactor using a dosing system design.

Because heat transfer during propagation and transfer may be critical in medium and large size batch reactors, loop type reactors can be used to reduce the induction period by temperature cycling in the loop, for the product is a liquid or semiliquid. Also, continuous telomerization systems may be used in which the telogen or monomer is fed into the system and polymer withdrawn.

Though these concepts are illustrated throughout with respect to a loop reactor and preferably a plug flow reactor in series, these inventive concepts of using a deactivating catalyst at higher unreacted oxide concentrations can be used for semi-batch operation. A determination of the amount of unreacted oxide during the semi-batch operation is not clearly defined in the prior art. However, for the semi-batch reactors, the prior art relied upon propylene oxide to activate the catalyst with a certain amount of propylene oxide in an initiator. Typically the amount is 12 percent by weight to 14 percent by weight propylene oxide and then the pressure drops. The concepts as present in the present application are capable of maintaining the pressure below a certain range.

In a preferred embodiment, the loop reactor includes at least one heat exchanger in series and at least one circulation pump. The loop reactor effluent leaves the loop reactor after the circulation pump and is fed into the plug flow reactor. The reagents are fed into the loop reactor system after the loop reactor effluent point in the preferred embodiment.

A static or dynamic mixing device may be installed to mix the circulating flow in the loop reactor with the reactor feed streams. The actual loop reactor circulation flow rate is a trade-off between conditions required for efficient heat removal in the heat exchangers, pressure drop/pump energy requirements over the loop reactor, and mixing requirements. Preferably, the heat exchangers are of the shell and tube type with the coolant on the tube side for efficient heat transfer. However, those skilled in the art will recognize that other more compact configurations are applicable for use with the present invention.

In the preferred embodiment, the plug flow reactor is designed as a jacketed pipe with coolant inside the jacket. The process side, inside the pipe, is preferably equipped with static mixer elements to enhance plug flow conditions.

The digester vessel is preferably a normal pressure vessel with sufficient residence time to convert the unreacted oxides to below a maximum allowable level as specified by product quality requirements. Alternatively, the unreacted oxide is removed by vacuum and temperature, such as applied at a falling film evaporator with or without the help of stripping agents such as c nitrogen added counter-currently.

This system allows for continuous operation and liquid full capacity. This allows for the operation of the vessels without a vapor space. By doing so, the operating constraints as determined by the process safety requirements of the prior art are overcome. The potentially explosive compositions that may exist in a vapor space of the vessels of the prior art cannot exist in the present invention.

Figure 2:
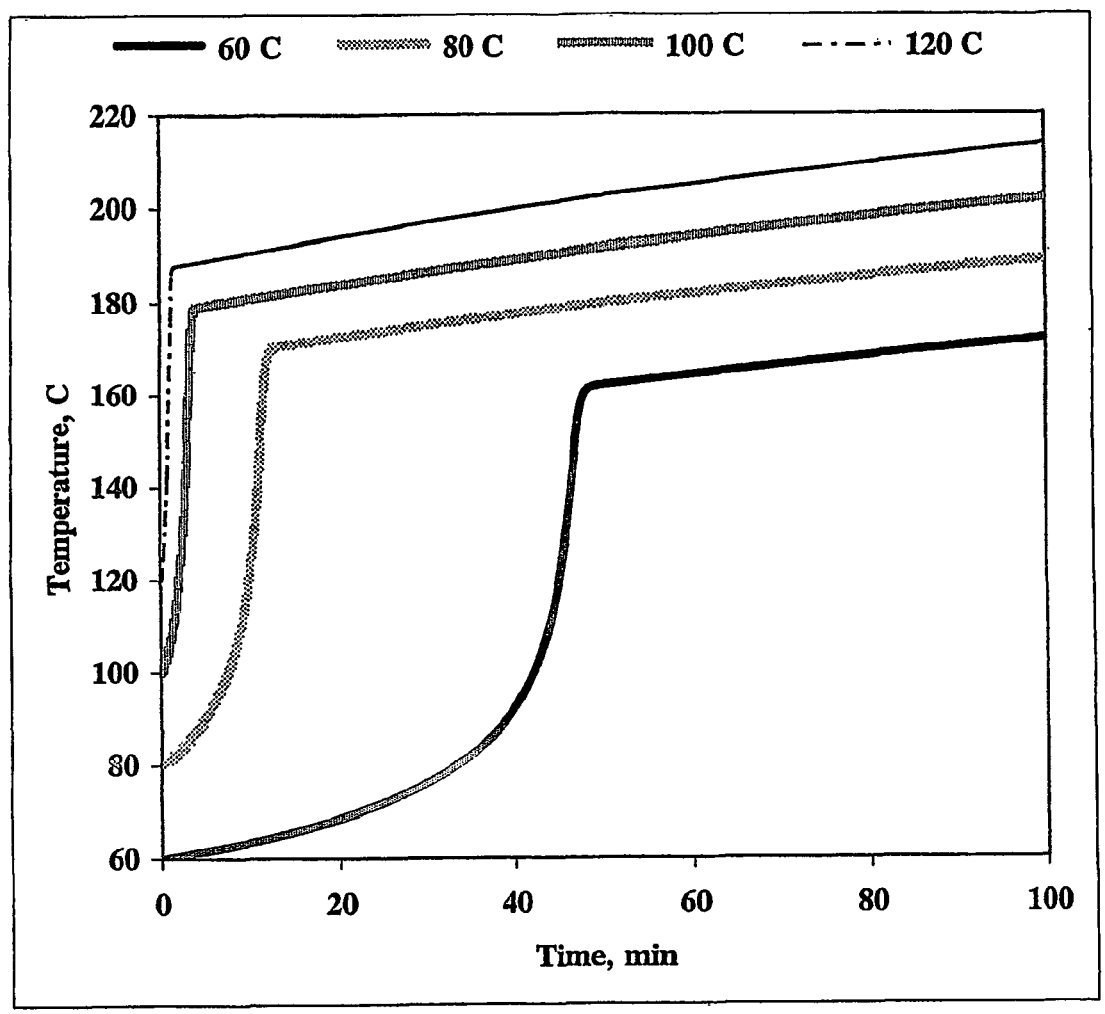
FIG. 2 is a graph that shows the effect of initial reaction temperature on exotherm for a deactivating catalyst.

FIG. 2 shows the effect of polymerization temperature on the adiabatic temperature rise. This graph shows the effect of initial reaction temperature on exotherm for a thermally deactivating catalyst. This shows that from a safety perspective it would be beneficial to operate at lower temperatures than higher temperatures at the same oxide concentration. As a result, it is possible to operate the system at higher unreacted oxides also referred to as unconverted oxide concentrations. Higher unreacted oxides allow for faster activation of catalysts and higher reaction rates at lower catalyst concentrations.

Figure 3:
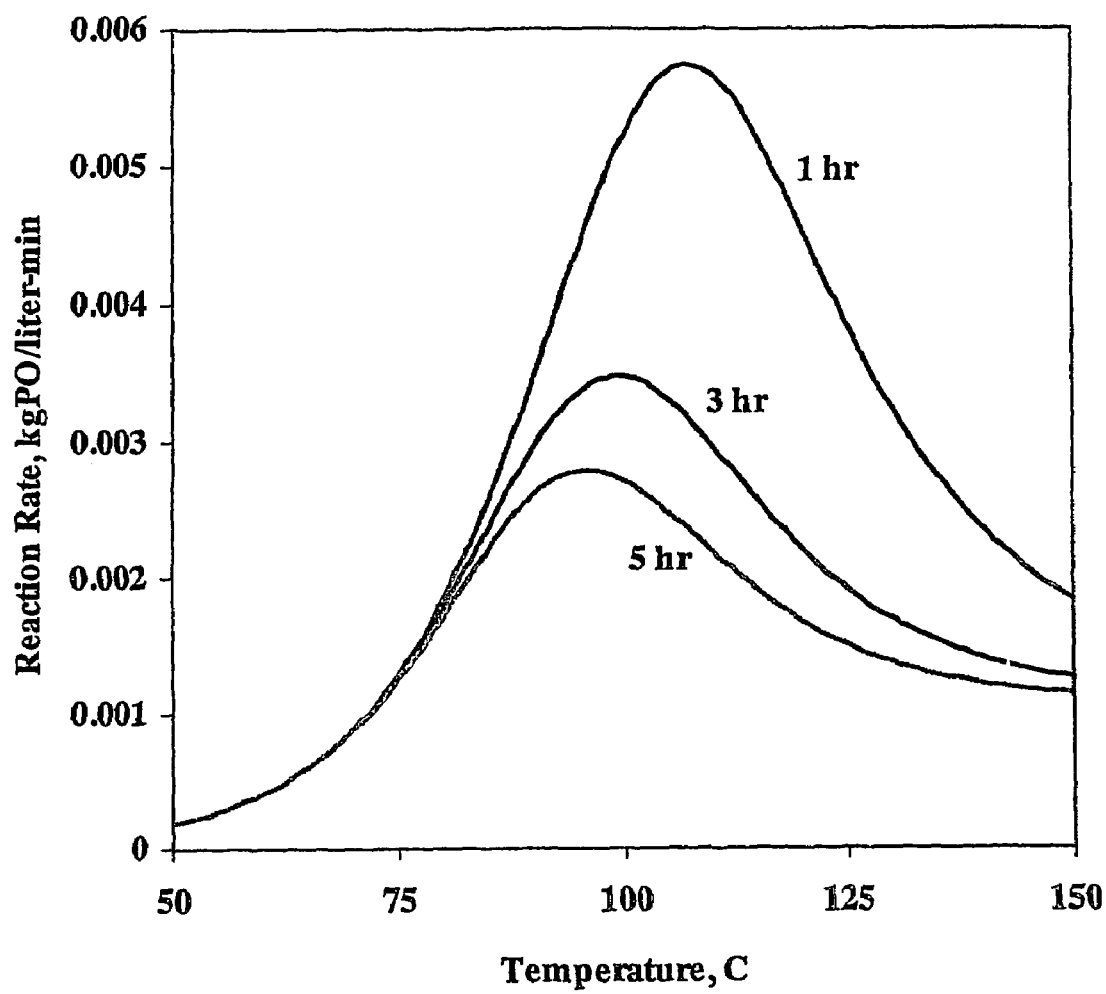
FIG. 3 shows that for a deactivating catalyst and a loop reactor that there is an optimal operation temperature depending on the residence time for a given unreacted oxide concentration.

FIG. 3 is a graph that shows the optimum reaction temperature for different values of residence time in a continuous reactor when a thermally deactivating catalyst is used. At 110° C., for example, the reactor with a residence time of 1 hour has a polymerization rate that is twice the rate of the same reactor at 135° C. Operating the reactor at the optimum temperature is thus desirable since, for a given polymerization rate, this type of operation allows lower catalyst and lower unconverted oxide concentrations.

The optimum reaction temperature is the result of two opposing mechanisms whose rates increase with temperature. One mechanism is the deactivation of the catalyst and the other is the chain growth mechanism. At low temperatures, the rate of catalyst deactivation is slow but so is the rate of chain growth. At high temperatures, chain growth should be faster but the overall process is slow because the catalyst has lost most of its activity. High reactor residence times allow more catalyst deactivation, giving lower polymerization rates at the optimum temperature.

Notably, the coordination catalyst is important to this type of reaction. By using a loop reactor as the primary reactor, the reagent streams are immediately exposed to active catalyst already present in the loop reactor, due to the back mixing nature of the system. Because of the residence time in the entire system, the catalyst has sufficient time to activate at reactions conditions either in the loop reactor or in the loop reactor and plug flow reactor combination.

Moreover, the heat transfer capability of the reactor system is usually the overall limiting factor as to the overall production rate, because of the polyol viscosity at the heat exchanger wall and the total installed heat transfer area. In the loop reactor, most of the reactor volume is in the heat exchanger by design where coolant temperature differences are relatively small. Therefore, the polyol viscosity effects near the heat exchanger wall on the heat transfer rate are negligible, and the installed heat transfer area is so large that the system may be reaction rate constrained instead of heat transfer limited.

Furthermore, the reactor system is less reaction rate constrained by using coordination catalyst that have improved characteristics. In the preferred embodiment, the thermally deactivating property of this catalyst may allow for the catalyst to aid in the control of the reaction rate. This thermally deactivating property may allow the catalyst to effectively prevent the thermal decomposition of the contents of the loop reactor and/or the plug flow reactor, thus inhibiting the rupturing of at least one of these reactors.

Additionally, the use of these types of catalysts allow for customization of the design of the system. The system may therefore be designed in light of reagent feed systems, reactor systems such as a loop reactor in series with a plug flow reactor, product storage as the plug flow reactor effluent will be at product specifications, and additional factors or combinations of the above.

Figure 4:
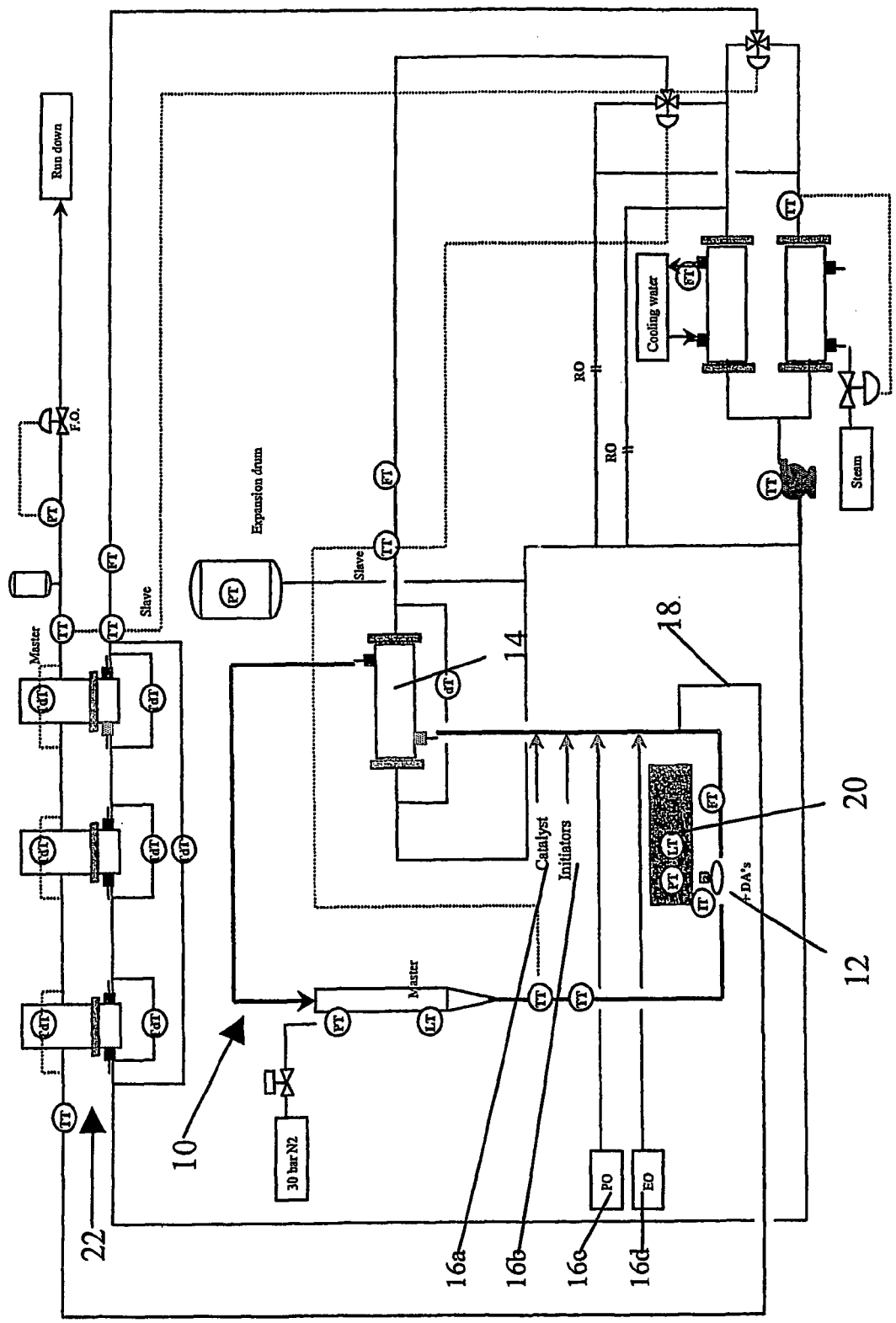
FIG. 4 is a schematic for a loop reactor followed by a plug flow reactor.

An improved safety alkoxylation reactor design was developed based on the loop reactor design followed by a plug flow reactor as shown in FIG. 4. This design is particularly effective for use with reactions having highly exothermic kinetics.

The loop reactor 10 may include a recycle pump 12, heat exchanger(s) 14, raw material inputs 16a and/or 16b, product take off 18 and a control system 20. The loop reactor 10 preferably operates at a controlled pressure that is dictated by the reactor temperature and unreacted oxide concentration. The product take off 18 then goes to a plug flow reactor 22 to digest or complete the reaction of the unreacted oxide. The catalyst is preferably added as a pumpable slurry in an initiator material. Propylene oxide 16c and ethylene oxide 16d may be fed as well into the loop reactor 10.

The loop reactor is specifically operated without a vapor space in the loop reactor. This offers an additional safety advantage with handling oxides. Vapor space concentration of ethylene oxide typically needs to be controlled in semi-batch reactors to avoid explosion conditions and the reduction or elimination of a vapor space is an enhancing feature of the loop reactor design. The elimination of the vapor space also helps eliminate the potential for gel formation associated with the use of DMC catalysts. Sticky polyol gels tend to form in reactors using DMC catalysts, and these gels tend to accumulate over time, fouling the reactor and eventually forcing a shutdown.

The loop reactor can also be operated at different recycle/feed flow ratios which allows the reactor to be operated like a completely backmixed reactor or as a moderately backmixed reactor. This is an advantage over the prior art in that the rate of the reaction rather than the temperature may control the output of the system.

The product polymer may have various uses, depending on its molecular weight, equivalent weight, functionality and the presence of any functional groups. Polyether polyols that are made are useful as raw materials for making polyurethanes. Polyether polyols can also be used as surfactants, hydraulic fluids, as raw materials for making surfactants and as starting materials for making aminated polyethers, among other uses.

The catalyst is preferably complexed with an organic complexing agent. A great number of complexing agents are potentially useful, although catalyst activity may vary according to the selection of a particular complexing agent. Examples of such complexing agents include alcohols, aldehydes, ketones, ethers, amides, nitriles, and sulfides. In a preferred embodiment, the catalyst is a double metal cyanide.

Suitable polyols include polyethers based on ethylene oxide (EO), propylene oxide (PO), butylene oxide (BO), and random or block mixtures thereof. Low molecular weight polyether polyols, particular those having an equivalent weight of 350 or less, more preferably 125-250, are also useful complexing agents.

For making high molecular weight monofunctional polyethers, it is not necessary to include an initiator compound. However, to control molecular weight and molecular weight distribution impart a desired functionality (number of hydroxyl groups/molecule) or a desired functional group, an initiator compound is preferably mixed with the catalyst complex at the beginning of the reaction. Suitable initiator compounds include monols and monoalcolaols such methanol, ethanol, n-propanol, isopropanol, n-butanol, isobutanol, t-butanol, octanol, octadecanol, 3-butyn-1-ol, 3-butene-1-ol, propargyl alcohol, 2-methyl-2-propanol, 2-methyl-3-butyn-2-ol, 2-methyl-3-butene-2-ol, 3-butyn-1-ol, and 2-butene-1-ol. Suitable monoalcohol initiator compounds include halogenated alcohols such as 2-chloroethanol, 2-bromoethanol, 2-chloro-1-propanol, 3-chloro-1-propanol, 3-bromo-1-propanol, 1,3-dichloro-2-propanol, 1-chloro-2-methyl-2-propanol and 1-t-butoxy-2-propanol as well as nitroalcohols, keto-alcohols, ester-alcohols, cyanoalcohols, and other inertly substituted alcohols. Suitable polyalcohol initiators include ethylene glycol, propylene glycol, glycerine, 1,1,1-trimethylol propane, 1,1,1-trimethylol ethane, 1,2,3-trihydroxybutane, pentaerybritol, xylitol, arabitol, mannitol, 2,5-dimethyl-3-hexyn-2,5-diol, 2,4,7,9-tetramethyl-5-decyne-4,7-diol sucrose, sorbitol, alkyl glucosides such as methyl glucoside and ethyl glucoside, mixtures thereof.

The following examples are provided to illustrate the invention, but are not intended to limit its scope. All parts and percentages are by weight unless otherwise indicated.

EXAMPLES

DMC was prepared from methanolic $H_3Co(CN)_6$ (3.00 mmol, 7.70 wt percent (max) in MeOH, 1.76 meq $H^+$/g solution), ZnO (6.0 mmol), and trimethylolpropane in methanol solvent. VORANOL® polyol 2070 (a glycerol propoxylate triol with a formula weight of approximately 700 available from The Dow Chemical Company) was subsequently added and the resultant DMC complex was devolatilized with methanol/water distillation. (VORANOL is a trademark of The Dow Chemical Company.) Approximately 2.00 wt percent DMC/$ZnSO_4$ (Maximum) in 30:1 wt/wt VORANOL 2070 polyol/trimethylolpropane. Notably, this preparation may use less ZnO, thus providing a slightly acidic slurry and was performed with a 2.33:1 total Zn:Co ratio.

A methanolic solution of $H_3Co(CN)_6$ (8.50 g of 7.70 wt percent solution, approximately 2.7-3.0 mmol,) was added to an opaque, white slurry of ZnO (0.57 g, 7.0 mmol) and trimethylolpropane (1.87 g, 14 mmol) in methanol (40.0 g, 51 mL) dropwise via an addition funnel over 50 minutes with moderate-rapid stirring (250 mL round-bottom stripping flask with 1 inch long octagonal magnetic stir bar). The funnel was rinsed three times with 1½ mL of MeOH.

The ZnO appeared to slowly dissolve as the $H_3Co(CN)_6$ solution was added, simultaneously producing the DMC solid. The slurry was stirred for 20 minutes after the $H_3Co(CN)_6$ addition was complete. The slurry (61.99 g, pH=3-4) was very stirrable and consisted of a very finely divided white DMC suspension in methanol/TMP. The DMC particles appeared to be very finely divided, with no apparent "large" particles. The pH may be tested by first removing a small sample of the slurry then diluting with an equal volume of water.

VORANOL polyol 2070 (56.0 g) was then added to the stirred methanolic DMC/TMP slurry. The slurry was stirred for 10 minutes after the VORANOL polyol 2070 addition. The mass of the (pH=3-4) methanolic DMC/VORANOL polyol 2070/TMP slurry was 117.99 g. The slurry may became more translucent when the VORANOL polyol 2070 was added.

The magnetic stir bar was then removed (with small methanol rinses) and the volatiles (methanol) were distilled from the DMC slurry on a rotoevaporator. The distillation of the bulk of the methanol solvent was initially performed at up to 50° C./25 inches Hg vacuum with a moderate-strong nitrogen sweep. The distillation was conducted under these conditions (50° C./25 inches Hg vacuum) over 50 minutes, providing a translucent, white, highly dispersed slurry (mass=60.56 g, pH=3-4). At this point the vacuum was increased to 29-30 inches Hg vacuum (still 50 C) with a moderate nitrogen sweep. After 60 minutes of devolatilization at 50° C./29-30 inches Hg, the slurry (59.19 g, pH=3-4) was still translucent, white, and highly dispersed.

The temperature and vacuum were increased to 75-80° C./30 inches and a final finishing strip was performed for an additional 30 minutes at 75-80° C./30 inches Hg (full pump vacuum) with a slight nitrogen sweep. The slurry remained translucent and white during the finishing strip at 75-80° C., with no discoloration or darkening observed. No unreacted ZnO was visible in the slurry. (NOTE: Minimal additional mass loss was observed in the final (75-80° C.) finishing strip.) The flask containing the final highly dispersed, translucent, white DMC slurry (59.09, pH=3-4) was allowed to cool to room temperature under nitrogen then was capped with a rubber septum. The flask was taken into a nitrogen atmosphere drybox and the moderate viscosity slurry was poured into a storage bottle.

Using the DMC catalyst, the reaction kinetics of the polymerization of PO were developed using glycerine alkoxylates as initiators. From those kinetics, a reaction model was established. The model was used to run optimization experiments summarized below.

The reactor conditions are modeled with the following conditions shown in Table 1:

TABLE 1

| Modeled Reaction | |
|---|---|
| Variable | Value |
| Monomer Feed Rate (g/s) | 8.34 |
| Catalyst Slurry Feed Rate (g/s) | 0.03 |
| Fraction Catalyst in Feed Slurry (wt-frac) | 0.02 |
| Initiator Feed Rate (g/s) | 2.0 |
| Molecular Weight of Initiator (g/mol) | 700.0 |
| CSTR Reactor Volume (l) | 50.0 |
| CSTR Reactor Temperature (C.) | 110.0 |
| Tubular Reactor Volume (l) | 50.0 |
| Tubular Reactor Temperature (C.) | 125.0 |

The initiator is a 700 Mw triol. VORANOL polyol 2070 (56.0 g, approximately 80 mmol). The catalyst slurry feed rate (2 percent DMC in initiator) is adjusted and the results are shown in the Table 2:

TABLE 2

Modeled Reaction for Example.

| Variable | Value |
|---|---|
| Monomer Feed Rate (g/s) | 8.34 |
| Catalyst Slurry Feed Rate (g/s) | 0.025 |
| Tubular Reactor Volume (l) | 50 |
| Result | |
| CSTR PO outlet conc. (wt percent) | 9.7 |
| PFR PO outlet conc. (ppm) | 6841 |
| Catalyst outlet conc. (ppm) | 48.2 |

A modeled reaction at a lower catalyst concentration is shown in Table 3:

TABLE 3

Modeled Reaction for Example 2 - Lower Catalyst Conc.

| Variable | Value |
|---|---|
| Monomer Feed Rate (g/s) | 8.34 |
| Catalyst Slurry Feed Rate (g/s) | 0.01 |
| Tubular Reactor Volume (l) | 150 |
| Result | |
| CSTR PO outlet conc. (wt percent) | 15.2 |
| PFR PO outlet conc. (ppm) | 6300 |
| Catalyst outlet conc. (ppm) | 19.3 |

The model shows by increasing the unreacted oxide concentration setpoint in the loop reactor from 10 to 15 percent, the catalyst concentration will be decreased by over 2 times. Turning to Table 4, a model is shown for doubling the reactor output:

TABLE 4

Modeled Reaction for Example 3 - Double Reactor Output

| Variable | Value |
|---|---|
| Monomer Feed Rate (g/s) | 15 |
| Catalyst Slurry Feed Rate (g/s) | 0.02 |
| Initiator Feed (g/s) | 4.0 |
| Tubular Reactor Volume (l) | 250 |
| Result | |
| CSTR PO outlet conc. (wt percent) | 19.5 |
| PFR PO outlet conc. (ppm) | 6380 |
| Catalyst outlet conc. (ppm) | 21 |

This example shows that continued increase in Loop reactor oxide concentration to 20 percent from 15 percent would allow a doubling of productivity at the same catalyst concentration. In each case, where the oxide concentration in the loop reactor is increased, the volume of the plug flow reactor may be increased in order to maintain a reasonable oxide concentration.

Oxide that remains in the polyol after the reactor is stripped out of the polyol and recycled back to the reactor or propylene oxide plant. There is an economic optimal on the amount of propylene oxide to be left in the polyol after the reactor.

In additional experiments, the reactor conditions are modeled with the following conditions shown in Table 5:

TABLE 5

Modeled Reaction

| Variable | Value |
|---|---|
| Monomer Feed Rate (g/s) | 8.34 |
| Catalyst Slurry Feed Rate (g/s) | 0.07 |
| Fraction Catalyst in Feed Slurry (wt-frac) | 0.02 |
| Initiator Feed Rate (g/s) | 2.0 |
| Molecular Weight of Initiator (g/mol) | 3000.0 |
| CSTR Reactor Volume (l) | 75.0 |
| CSTR Reactor Temperature (C.) | 100.0 |
| Tubular Reactor Volume (l) | 75.0 |
| Tubular Reactor Temperature (C.) | 105.0 |

The initiator is a 3000 Mw triol, VORANOL polyol 2070. The results are shown in Table 6:

TABLE 6

Modeled Reaction for Example 4.

| Variable | Value |
|---|---|
| Monomer Feed Rate (g/s) | 8.34 |
| Catalyst Slurry Feed Rate (g/s) | 0.07 |
| Tubular Reactor Volume (l) | 75 |
| Result | |
| CSTR PO outlet conc. (wt percent) | 9.0 |
| PFR PO outlet conc. (ppm) | 6700 |
| Catalyst outlet conc. (ppm) | 134 |

A modeled reaction at a lower catalyst concentration is shown in Table 7:

TABLE 7

Modeled Reaction for Example 5 - Lower Catalyst Conc.

| Variable | Value |
|---|---|
| Monomer Feed Rate (g/s) | 8.34 |
| Catalyst Slurry Feed Rate (g/s) | 0.035 |
| Tubular Reactor Volume (l) | 315 |
| Result | |
| CSTR PO outlet conc. (wt percent) | 15.2 |
| PFR PO outlet conc. (ppm) | 6700 |
| Catalyst outlet conc. (ppm) | 67 |

The model shows that by increasing the unreacted oxide concentration setpoint in the loop reactor from 9 to 15 percent, the catalyst concentration will be decreased by over 2 times. Turning to Table 8, a model is shown for doubling the reactor output:

TABLE 8

Modeled Reaction for Example 6 - Double Reactor Output

| Variable | Value |
| --- | --- |
| Monomer Feed Rate (g/s) | 16.68 |
| Catalyst Slurry Feed Rate (g/s) | 0.07 |
| Initiator Feed (g/s) | 4.0 |
| Tubular Reactor Volume (l) | 650 |
| Result | |
| CSTR PO outlet conc. (wt percent) | 20.0 |
| PFR PO outlet conc. (ppm) | 6700 |
| Catalyst outlet conc. (ppm) | 67 |

This example shows that continued increase in Loop reactor oxide concentration to 20 percent from 15 percent would allow a doubling of productivity at the same catalyst concentration. In each case, where the oxide concentration in the loop reactor is increased, the volume of the plug flow reactor may be increased in order to maintain a reasonable oxide concentration.

Based on the data obtained from the model simulations, production of polyol in a pilot plant are performed using a DMC catalyst as prepared above. The initial set of pilot plant conditions are shown in Table 9:

TABLE 9

Basic Set of Pilot Plant Conditions - Example 7

| Variable | Value |
| --- | --- |
| Monomer Feed Rate (kg/hr) | 10.3 |
| Catalyst Slurry Feed Rate (g/hr) | 50 |
| Catalyst in Feed Slurry (wt-fracation) | 0.03 |
| Initiator Feed Rate (kg/hr) | 2.1 |
| Molecular Weight of Initiator (g/mol) | 625 |
| Loop Reactor Residence Time (hr) | 5 |
| Loop Reactor Temperature (C.) | 94 |
| Tubular Reactor Residence Time (hr) | 5 |
| Tubular Reactor Temperature (C.) | 94 |

The initiator is a 625 Mw triol made from the KOH catalyst ethoxylation of glycerin. The potassium is removed via absorption on magnesium silicate to less than 5 ppm. The corresponding results are shown in Table 10:

TABLE 10

Results for Example 7.

| Variable | Value |
| --- | --- |
| Catalyst Slurry Feed Rate (g/hr) | 50 |
| Result | |
| Loop PO outlet conc. (wt percent) | 3.9 |
| Catalyst outlet conc. (ppm) | 121 |

An experiment at a lower catalyst concentration is shown in Table 11:

TABLE 11

Results for Example 8 - Lower Catalyst Conc.

| Variable | Value |
| --- | --- |
| Catalyst Slurry Feed Rate (g/hr) | 29 |
| Result | |
| Loop PO outlet conc. (wt percent) | 14.4 |
| Catalyst outlet conc. (ppm) | 70 |

These results show that by increasing the unreacted oxide concentration setpoint in the loop reactor from 3.9 to more than 14.4 percent, the catalyst concentration is decreased by almost 40 percent. Turning to Table 12, results are shown for the case where process output increases and catalyst concentration decreases when the unreacted oxide goes up:

TABLE 12

Operating Conditions and Results for Example 9

| Variable | Value |
| --- | --- |
| Loop Reactor Residence Time (hr) | 2 |
| Loop Reactor Temperature (C.) | 94 |
| Tubular Reactor Residence Time (hr) | 4 |
| Tubular Reactor Temperature (C.) | 94 |
| Result | |
| Loop PO outlet conc. (wt percent) | 16.7 |
| Catalyst outlet conc. (ppm) | 100 |

When compared to example 7, this example shows that increasing unreacted oxide concentration from 3.9 percent to 16.7 percent allows an increase in productivity by a factor of 2.5 and a reduction of almost 20 percent in catalyst concentration.

While only a few, preferred embodiments of the invention have been described, those of ordinary skill in the art will recognize that the embodiment may be modified and altered without departing from the central spirit and scope of the invention. Thus, the preferred embodiments described above are to be considered in all respects as illustrative and not restrictive, the scope of the invention being indicated by the following claims, rather than by the foregoing description, and all changes which come within the meaning and range of equivalents of the claims are intended to be embraced.

What is claimed is:

1. A continuous process of producing a polyether polyol which comprises the steps of:
    (a) continuously adding an unreacted oxide to a loop reactor without a vapor space, while adding at least one thermally deactivating catalyst and at least one initiator to the loop reactor; and
    (b) reacting at least a portion of the unreacted oxide to form polyether polyol;
    wherein the thermally deactivating catalyst is a double metal cyanide catalyst; and
    (c) processing the unreacted oxide and polyether polyol of step (b) in a plug flow reactor wherein a weight percentage of unreacted oxide in the loop reactor is more than about 14 weight percent.

2. The process of claim 1, wherein the catalyst is mixed in a pumpable slurry of a carrier.

3. The process of claim 1, wherein the unreacted oxide is selected from the group consisting of ethylene oxide, propylene oxide, butylene oxide, and mixture thereof.

4. The process of claim 1, wherein the initiator is a polyol.

5. The process of claim 1, wherein the weight percentage of unreacted oxide in the loop reactor is less than 20 weight percent.

6. The process of claim 1, wherein the concentration of catalyst in the loop reactor is less than about 150 ppm.

7. The process of claim 6, wherein the catalyst is mixed in a pumpable slurry of the initiator.

8. The process of claim 6, wherein the unreacted oxide is selected from the group consisting of ethylene oxide, propylene oxide, butyJlene oxide, and mixtures thereof.

9. The process of claim 6, wherein the initiator is a polyol.

10. The process of claim 1, wherein the thermally deactivating catalyst is capable of thermally deactivating prior to decomposition of polyether polyol; and wherein a rate of reaction in the loop reactor is at a rate at least two times faster than a rate of reaction in a loop reactor containing less than 14 weight percent unreacted oxide.

11. The process of claim 10, wherein the catalyst is mixed in a pumpable slurry of the initiator.

* * * * *